Nov. 19, 1929.   C. A. SULLIVAN   1,736,279
WHEEL
Filed Nov. 26, 1926   2 Sheets-Sheet 1

Inventor
Charles A. Sullivan,
By
Attorneys

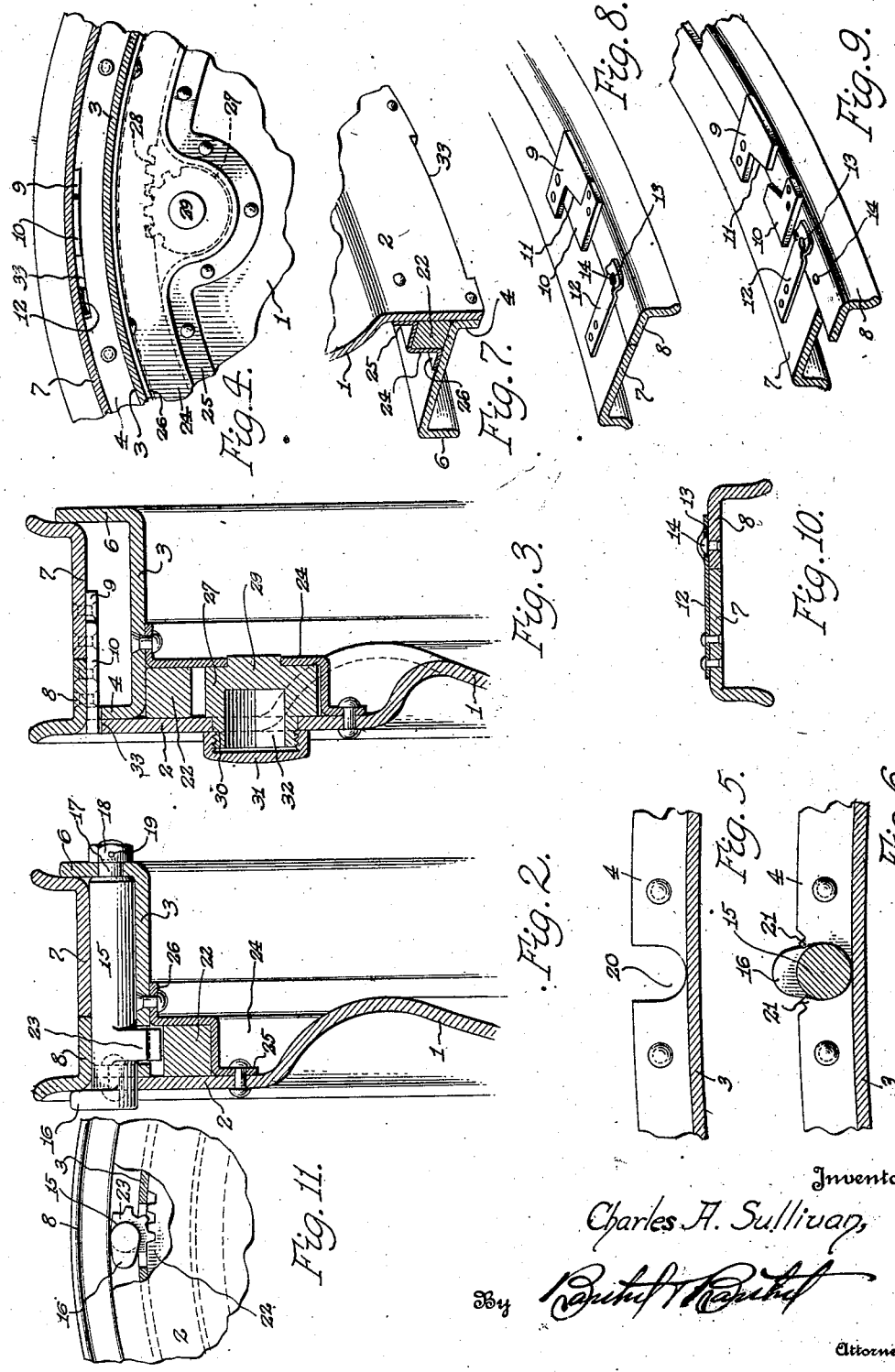

Patented Nov. 19, 1929

1,736,279

UNITED STATES PATENT OFFICE

CHARLES A. SULLIVAN, OF DETROIT, MICHIGAN

WHEEL

Application filed November 26, 1926. Serial No. 150,790.

This invention relates to wheels for motor vehicles and its object is to provide means for simultaneously operating all of the members for locking a rim in place upon the wheel, and to provide a simple and rigid wheel construction and rotatable locking members for locking a rim in place upon the wheel with said locking members housed within a felloe band and forming supports for the rim.

A further object is to provide an efficient locking construction and a compact arrangement thereof whereby the appearance of the wheel is changed but little from that of the ordinary disk wheel and all of the parts are securely housed and protected from the elements.

With the above and other ends in view, the invention consists in the matters hereinafter set forth and more particularly pointed out in the appended claims, reference being had to the accompanying drawings in which—

Fig. 2 is a vertical section substantially upon the line 2—2 of Fig. 1;

Fig. 3 is a similar section substantially upon the line 3—3 of Fig. 1;

Fig. 4 is a detail view showing a portion of the wheel in elevation and a portion in section, the same being an elevation of the rear side of the wheel;

Figs. 5 and 6 are sectional detail views of portions of the wheel felloe, Fig. 6 showing a rim locking member in place thereon;

Fig. 7 is a perspective detail of a portion of the wheel disk and felloe;

Figs. 8 and 9 are perspective details of a wheel rim detached and showing locking means for locking the two parts of the rim together, and Fig. 10 is a cross section of the rim through one of the locking members.

Fig. 11 is a fragmentary view of the wheel periphery with a portion broken away.

Figure 1:
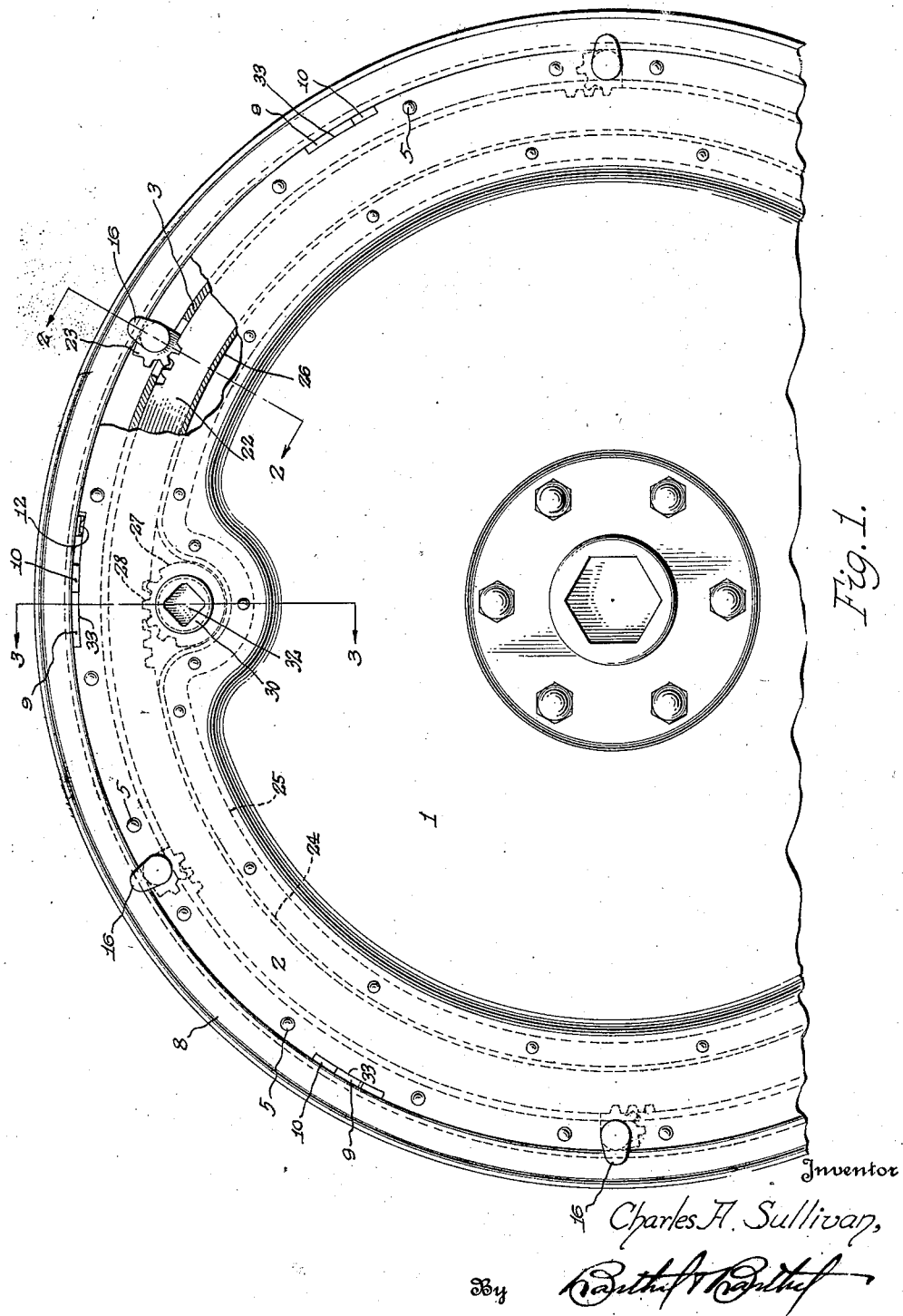
Figure 1 is a side elevation of a wheel illustrative of an embodiment of the invention and with portions thereof broken away and in section to more clearly disclose the construction.

The wheel illustrated in the accompanying drawings is of the disk type, the body of the wheel or the web which connects the hub with the rim portion being formed of a steel disk which is shaped in the usual manner to provide resiliency and strength. This web portion of the wheel, however, may be of any other desired form, such as wire or wood spokes, but in referring hereafter to this disk, it will be understood that reference is made more particularly to the peripheral portion of said disk which forms a side wall for the body of the wheel adjacent the rim or felloe thereof.

In the accompanying drawing, 1 indicates the wheel disk which is preferably concave intermediate the hub and peripheral portion of the disk, with said peripheral portion forming a side wall 2 adjacent the periphery of the wheel body. Secured to one side of this wall 2 is a channel-shaped felloe 3 of annular shape with the channel opening outwardly and with the flange 4 of said channel secured to the edge portion of the wall 2 in any suitable manner, as by rivets 5. The flange 4 of the channel 3 is secured in place with its edge even with the edge of the wall 2 of the disk but the opposite flange 6 of said channel is of greater width than the flange 4 to provide a stop or abutment against which one side of the wheel rim 7 abuts when said rim is in place upon the wheel. This rim 7 is of the usual channel form to receive and hold a pneumatic tire and is preferably formed in two parts, the rim being split longitudinally laterally of its longitudinal center line to provide a rim portion 8 of lesser width than the main portion 7 of the rim, each portion being provided with a side flange to engage and hold the tire in place thereon. When the rim is removed from the wheel and it is desired to remove the tire from the rim, it is necessary to separate the two parts of the rim and to hold these two parts in proper relation to hold the tire in place, the rim parts are provided with a plurality of plates or locking members riveted or otherwise rigidly secured flat upon the inner surface of the rim, the plate or locking member 9 being secured to the rim part 7 and the locking plate 10 being secured to the part 8 of the rim. These two locking plates have laterally extending portions which are adapted to interlock when the rim part 8 is moved in a longitudinal direction relative to the rim part 7 and the contacting edges 11 of these locking plates are inclined or cut away at an angle to the line of abutting edges of the rim parts so that when these plates are brought into interlocking relation by a relative turning movement of the rim parts, these inclined edges will serve to draw the edges of the rim parts firmly into engagement with each other. To prevent the relative turning movement of the rim parts 7 and 8 after they have been locked together by the locking plates, a spring clip 12 is provided, said clip comprising a flat spring riveted or otherwise secured at one end to the rim part 7 and formed adjacent its opposite end with an opening 13 to receive the head of a pin 14 on the rim part 8. When the parts 7 and 8 are turned relative to each other to interengage the locking plates, the spring clip 12 will snap over the head of the pin 14 and hold the rim parts so that the locking plates 9 and 10 will not be accidentally disengaged.

The internal diameter of the tire rim is substantially equal to the diameter of the wheel disk so that this rim may be readily slipped laterally over the edges of the wall 2 and the flange 4 and brought into engagement with the flange 6, spanning the channel felloe, and to hold this rim in place, a series of bolts 15 are mounted within the channel 3 transversely thereof, each bolt being formed with a laterally extending lip or head portion 16 at one end to engage the outer side of the tire rim and thus hold the rim securely in place upon the channel felloe. These bolts 15 are preferably of a diameter equal to the width of the flange 4 of the channel so that the rim, when in place, will be supported in the channel by these bolts. Each of these bolts is mounted for free rotation by reducing the inner end portion of the bolt, as at 17, to engage an opening in the side flange 6 of the channel 3, said reduced portion of the bolt extending through the opening and being provided with a suitable nut 18 or other holding device which is secured to the bolt in any suitable manner as by a pin 19.

In order to mount these bolts 15 within the channel 3, the flange 4 of the channel and the edge portion of the wall 2 of the disk are notched, as shown at 20, in Figs. 5 and 6, so that each bolt may be dropped into a notch and rest therein adjacent its outer end with the head 16 outside of the plane of the outer surface of the wall 2 so that when the bolts are turned these laterally extending heads will swing upwardly and engage the outer side of the tire rim, forcing said rim laterally into engagement with the flange 6 and securely holding the rim in place upon the wheel.

In order to prevent these bolts from being accidentally disengaged from their seats or notches 20 when the rim is not in place, portions 21 of the edges of the flange 4 and wall 2 at each side of each notch 20 are bent inwardly to a slight degree, as shown in Fig. 6, over each bolt.

In order that the several bolts 15 may be simultaneously rotated to disengage their heads 16 from the tire rim and thus provide for the ready removal of the rim from the wheel, a ring gear 22 is mounted at the inner side of the wall 2 adjacent the channel 3 and each of the bolts 15 is provided with an integral gear sector 23 preferably formed integral with the bolts and providing teeth to be engaged by like teeth formed in the periphery of the ring gear 22, which ring gear may, as shown, be provided with teeth only at those points adjacent each of the several bolts. To form a housing and guide bearing for the ring 22, an annular sheet metal member 24 which is of angular form in cross section to conform to the shape of the inner side surface and inner edge of the ring and provided with flanges 25 and 26, is secured across the angle between the channel member 3 and the wall 2, by riveting the flange 25 to the wall 2 and the flange 26 to the bottom wall of the channel 3. A guide way and housing which is rectangular in cross section is thus provided for the ring 22 by this annular member 24 and the wall 2 of the disk and the bottom wall of the channel 3, openings being provided in the bottom wall of the channel 3 so that the sectors or teeth 23 on the bolts may project therethrough into engagement with the teeth on the ring 22. All of the bolts 15 may therefore be rotated in unison by rotating the ring 22 around the wheel within its guide channel and to so rotate this ring a mutilated pinion 27 or a pinion having teeth on only a portion of its periphery, is provided to engage teeth 28 formed in the inner side of the ring adjacent this gear wheel and said gear is housed and mounted for rotative movement by enlarging inwardly the annular housing wall 24 to receive the gear and providing in said wall an opening to receive a hub 29 formed on the gear. At the opposite end the gear is formed with an outwardly extending axial portion or hub 30 to engage an opening in the wall 2 of the wheel disk, the gear being thus journaled within the opening of the wall 2 and within the opening in the inner wall of the annular casing member 24, said casing and wall together forming a housing for the gear.

The outer projecting end portion 30 of the gear is externally screw-threaded to receive a lock nut or cap 31 so that by screwing this cap upon the hub of the gear and into firm contact with the outer surface of the wall 2, the gear is locked against rotation and thus locks the ring gear 22 and the several locking bolts 15. To provide for rotating the gear 27, said gear is formed with a socket 32 extending inwardly from the outer end of its hub 30 to receive a suitable tool or crank for rotating the gear.

As shown, the locking plates 9 and 10 for locking the rim parts 7 and 8 together, are riveted upon the inner surface of the rim and to receive these locking plates when the rim is mounted upon the wheel, the outer edges of the wall 2 and flanges 4 are notched, as at 33, so that the rim may be slipped laterally into place upon the channel felloe and will rest upon the several bolts 15 and on the edges of said wall and flange. These notches 33 also serve the purpose of preventing the rim from rotating upon the wheel relative to the channel 3.

When it is desired to remove the rim from the wheel, it is only necessary to unscrew the cap 31 and insert a suitable tool in the socket 32 of the gear 27 and then give the gear a part turn which will move the ring 22 and through its engagement with the teeth 23 on the several bolts 15, rotate these bolts and swing the heads 16 of the bolts out of engagement with the rim, when the rim may be pulled off laterally from the wheel. The dismounting of the rim is thus greatly expedited and by making the rim in two parts which are interlocked by the plates 9 and 10, the tire may be very quickly and easily removed from the rim by removing the rim part 8 in a longitudinal direction relative to the part 7.

In the present construction all of the moving parts are securely housed and guided so that water and dirt will not interfere with their ready operation and the appearance of the wheel is not materially changed from that of the ordinary disk wheel.

Changes in the size or proportion of parts and their arrangement and construction, within the scope of the appended claims, is contemplated, and I do not, therefore, limit myself to the particular construction shown.

Having thus fully described my invention, what I claim is:—

1. In a wheel, the combination of a body including a peripheral wall portion, a channel shaped felloe secured to said wall, a plurality of locking bolts journaled in said felloe channel transversely thereof, said bolts being each provided with a laterally projecting portion to engage a rim demountably mounted on said felloe and with teeth, a ring member formed with teeth to engage the teeth on said bolts, said ring member being mounted within the meeting angle between said channel felloe and said wall, and an annular member secured to said wall and channel felloe and forming a guide and housing for said ring member.

2. A wheel as characterized in claim 1 and further characterized in that said channel felloe is positioned with the open side of its channel opening outwardly and with the side flanges of the channel formed with openings to receive the end portions of said bolts, the bottom wall of said channel being formed with openings through which the teeth on said bolts project, and one of the side flanges of said channel being of greater width than the other to form an abutment for one side of a rim mounted over said channel.

3. In a wheel, the combination of a disk having a peripheral portion forming a side wall, a channel shaped felloe secured to said wall and extending laterally therefrom with one flange of the channel secured to the wall with the channel opening outwardly and the other flange of the channel of greater width than the secured flange to provide an abutment for one side of a rim demountably mounted over said channel, a plurality of bolts in said channel extending transversely thereof and journaled at their ends in said flanges, said bolts being formed each with a head at one end extending laterally therefrom to engage a side of a rim mounted on the channel and also formed with teeth extending laterally from said bolts, said channel being formed in its bottom wall with openings through which the teeth on said bolts project, a ring member mounted in the meeting angle between said side wall and the bottom wall of the channel and provided with teeth in engagement with the teeth on said bolts, an annular casing member secured across the meeting angle between said side wall and bottom wall of said channel and forming a guide and casing for said ring member, and a gear journaled in said casing to engage teeth on the inner side of said ring member, said gear having a hub portion journaled in the said side wall and extending therethrough and formed to receive a tool for turning the gear.

In testimony whereof I affix my signature.

CHARLES A. SULLIVAN.